Patented July 3, 1945

2,379,821

UNITED STATES PATENT OFFICE 2,379,821

COMPOUNDS

Henry Charles Miller, Claymont, and Richard Seyfarth Schreiber, Wilmington, Del., assignors to E. I. du Pont de Nemours & Company, Wilmington, Del., a corporation of Delaware No Drawing. Application December 30, 1942, Serial No. 470,666

4 Claims. (Cl. 260—607)

This invention relates to the preparation of organic compounds and more particularly to the preparation of organic compounds of silicon.

Organic compounds of silicon have hitherto been made by the reaction of silicon halides with organomagnesium compounds or with hydrocarbon halides and alkali metals. Both of these methods require expensive reagents and are therefore disadvantageous.

This invention has as an object the provision of a new process for the manufacture of organic silicon compounds. A further object is the provision of a process for preparing organic silicon halides. Other objects will appear hereinafter.

These objects are accomplished by the following invention wherein an inorganic silicon halide containing silicon, a halogen of atomic weight above twenty and preferably free from elements other than silicon, hydrogen, and halogen is reacted in the vapor phase at temperatures of at least 450° C. with a hydrocarbon. The silicon halide and the hydrocarbon are volatile under the pressure and at the temperature used.

The preferred method of practicing this invention involves heating a mixture of a hydrocarbon and the silicon halide to a temperature of 600 to 850° C. This is preferably carried out by passing the vapors of the reactants through a heated reaction zone or over a heated surface, condensing the vapor and separating the hydrocarbon substituted silicon halide from the liquid so obtained by fractional distillation or other suitable means.

The more detailed practice of the invention is illustrated by the following examples, wherein parts given are by weight. There are of course many forms of the invention other than these specific embodiments.

Example I

This example illustrates the preparation of phenyl-silicon trichloride by passing a mixture of benzene and silico-chloroform, $HSiCl_3$, through a heated zone.

A mixture of 1 part of benzene and 1.5 parts of silicochloroform was introduced into a tube, heated externally to 750-770° C., of fused quartz and filled with small pieces of clay plate. The rate of addition was controlled so that the space velocity was of the order of 80 to 90 per hour. The vapors issuing from the heated tube were condensed by a water cooled condenser. The condensate was fractionally distilled to isolate phenylsilicon trichloride, $C_6H_5SiCl_3$, boiling point 71-74° at 11 mm.

Example II

This example illustrates the preparation of an aryl silicon trichloride by passing the vapors of an aromatic hydrocarbon and silicon tetrachloride over a heated surface.

Benzene and silicon tetrachloride in the ratio of 1 to 2 were conducted in the vapor phase over a fused quartz tube heated to bright redness. The system was so arranged that substances boiling above 100° C. were condensed but the unchanged reactants were continuously recycled over the heated tube. The higher boiling material was removed and fractionally distilled under reduced pressure to obtain pure $C_6H_5SiCl_3$ which boils at 90 to 100° at 25 mm. mercury pressure. The product was a colorless liquid which fumed in moist air and had a sharp odor. It contained 13.01% silicon and 48.4% chlorine. The theoretical values for $C_6H_5SiCl_3$ are 13.24% silicon and 50.4% chlorine.

Example III

This example illustrates the preparation of a hydrocarbon substituted silicon halide from a polycyclic aromatic hydrocarbon and silicon tetrachloride.

A solution of 1 part naphthalene in 4 parts of silicon tetrachloride was treated as described in Example I at a temperature of 850 to 870° C. The product, isolated by fractional distillation under reduced pressure, fumed in moist air and reacted vigorously with water to give an ether-soluble naphthalenesiliconic acid.

Example IV

This example illustrates the preparation of a hydrocarbon substituted silicon halide from an olefin and silicon tetrachloride.

Two parts of octene-1 and 3 parts silicon tetrachloride were mixed and treated as described in Example I at a temperature of 700-720° C. The unchanged silicon tetrachloride was removed from the condensate by fractional distillation leaving a dark colored oil which reacted vigorously with water and contained 4.21% silicon.

Example V

This example illustrates the preparation of a hydrocarbon substituted silicon halide from an olefin and silicochloroform.

A mixture of 11 parts of silicochloroform, $SiHCl_3$, and 9 parts of n-octene-1 was treated as described in Example I at a temperature of 600 to 610° C. The unchanged silicochloroform was removed from the condensate by fractional distillation. The residue boiled in the range of 140-200° C. and reacted vigorously with water to give an ether soluble precipitate which contained silicon.

Example VI

This example illustrates the preparation of a hydrocarbon substituted silicon halide from a paraffin hydrocarbon and silicon tetrachloride.

One part of isobutane as a gas and 4 parts of silicon tetrachloride as a liquid were introduced into a fused quartz tube packed with clay plate, heated to 800° C. as described in Example I. The unchanged silicon tetrachloride was removed from the condensate by fractional distillation. There remained a green oil which was distilled at atmospheric pressure. The fraction boiling above 90° C. contained 12.42% silicon and 46.99% carbon. This corresponds approximately to dibutylsilicon dichloride.

The examples disclose the reaction of inorganic silicon halides with aromatic and aliphatic saturated and unsaturated hydrocarbons but the invention is generic to hydrocarbons, including saturated and unsaturated, cyclic and acyclic, straight chain and branched chain, aliphatic, aromatic and mixed aromatic aliphatic hydrocarbons and mixtures of hydrocarbons including methane, propane, dodecane, isobutane, neopentane, ethylene, octene, decadiene-1,9, butadiene, acetylene, hexine, cyclopentane, cyclopentadiene, cyclohexane, cyclohexene, p-menthane, p-menthene, pinene, dipentene, alpha-terpinene, benzene, diphenyl, naphthalene, anthracene, toluene, styrene, and diphenylmethane.

Commercial grades of hydrocarbons are satisfactory if they do not contain excessive amounts of water, alcohol, amines or other substances capable of giving rise to undesirable side reactions with silicon tetrachloride. Aromatic hydrocarbons are preferred. The hydrocarbons may be substituted with any group which is non-reactive toward silicon halide, as for example, halogen.

The inorganic silicon halides useful in the process of this invention contain at least one halogen of atomic weight above twenty and preferably no element other than silicon, hydrogen, and the halogens. The preferred silicon halides have the formula

$$Si_nH_aX_b$$

where $a+b$ is $2n+2$, $n$ and $b$ are intergers greater than 0 and not more than 6 and $a$ may be zero or an integer whose value depends then on $n$ and $b$. At least one X atom is a halogen of atomic weight above twenty. Thus, the invention is preferably practiced with $SiFCl_3$, $SiF_3Cl$, $SiF_2Br_2$, $SiFBr_3$, $SiCl_4$, $SiH_2Cl_2$, $SiHCl_3$, $Si_3Cl_8$, $Si_2H_4Cl_2$, $Si_6Cl_{14}$, $SiBr_4$, $SiHBr_3$, $SiClBr_3$, $SiBrCl_3$, $Si_2HBr_5$, $Si_4Br_{10}$, $SiCl_2I_2$, $SiBrI_3$, $Si_2I_6$, although silicon oxyhalides such as $Si_2Cl_6O$, $Si_3O_3Cl_6$, $Si_6O_7Cl_{10}$, $Si_4O_4Cl_8$, can also be used. Mixtures of silicon halides may be employed.

Commercial grades of inorganic silicon halides have been found to be satisfactory. Those not available commercially can be prepared by methods described in J. W. Mellor, "A Comprehensive Treatise on Inorganic and Theoretical Chemistry," vol. 6, part 2, pages 960 to 985, Longmans, Green and Co., London, England; W. C. Schumb & H. H. Anderson, J. Am. Chem. Soc., vol. 58, 994 (1936); H. S. Booth and C. F. Swinehart, J. Am. Chem. Soc., 57, 1333 (1935); or Friend, Textbook of Organic Chemistry, vol. V (1917), pages 187 to 192, 194 to 202.

The method of mixing the reactants or the introduction of them into the reaction zone may be accomplished by any convenient means. The reaction may be carried out at subatmospheric, atmospheric or superatmospheric pressure. The reaction takes place at temperatures as low as 450° C. but proceeds more rapidly at higher temperatures and is operable even as high as 1000° C.

The upper limit of temperature is determined by the stability of the hydrocarbon under the reaction conditions and the product and generally is below the temperature at which excessive decomposition sets in. The upper limit of the temperature depends upon the rate at which the reactants are passed through the heated zone and in general varies directly with the space velocity. The space velocity itself can be varied over wide limits but the optimum space velocity depends upon the nature of the reactants and the temperature of the reaction zone and is readily determined in any given case.

The tube may be made of any material impermeable to gases and capable of withstanding the elevated temperature and the action of silicon halide. It is preferred but not at all necessary to fill the heated zone loosely with an inert material to aid in uniform heating of the gases. Although the examples illustrate the use of clay plates for filling the heating zone, the process is not limited to the use of such filler. Carborundum, heat resistant glass beads, carbon, silica gel or any material resistant to silicon halides at elevated temperatures may be used.

The material may be collected in any convenient manner after it has passed through the heated zone and may be isolated from other products and unreacted materials in any suitable way. Fractional distillation is ordinarily used.

The process of this invention is of use in the preparation of products hitherto obtainable only through expensive processes such as the Grignard reaction. The products obtained may be used as intermediates for the preparation of organosilicon acids, esters, etc., and upon hydrolysis give rise to polymers from which coating compositions unusually resistant to high temperature and chemical attack can be prepared.

The above description and examples are intended to be illustrative only. Any modification of or variation therefrom which conforms to the spirit of the invention is intended to be included within the scope of the claims.

What is claimed is:

1. A process for the preparation of organosilicon compounds which comprises reacting an inorganic silicon halide having at least one halogen atom of atomic weight above twenty with an aliphatic hydrocarbon in the vapor phase at a temperature of at least 450° C. and below the decomposition temperatures of the reactants under the reaction conditions and isolating the organosilicon compound.

2. A process for the preparation of organosilicon compounds which comprises reacting an inorganic silicon halide having at least one halogen atom of atomic weight above twenty and which is free from atoms other than silicon, hydrogen, and halogen atoms, with an aliphatic hydrocarbon in the vapor phase at 600–850° C. and isolating the organosilicon compound.

3. A process for the preparation of organosilicon compounds which comprises reacting a silicon halide containing only silicon and halogen atoms, at least one of which has an atomic weight above twenty, with an aliphatic hydrocarbon in the vapor phase at 600–850° C. and isolating the organosilicon compound.

4. A process for the preparation of organosilicon compounds which comprises reacting silicon tetrachloride with an aliphatic hydrocarbon in the vapor phase at 600–850° C. and isolating the organosilicon compound.

HENRY CHARLES MILLER.
RICHARD SEYFARTH SCHREIBER.